Nov. 28, 1950 R. T. REESE 2,531,892
BOLT AND NUT FIXTURE
Filed Jan. 27, 1947
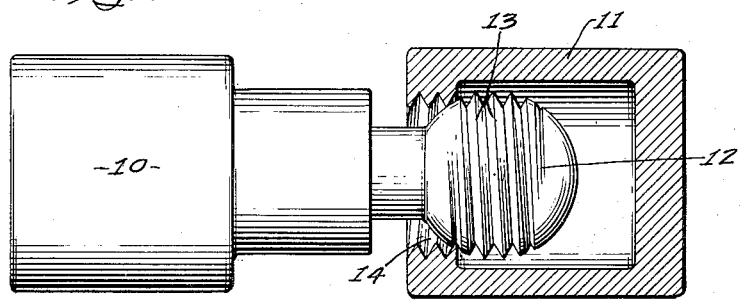
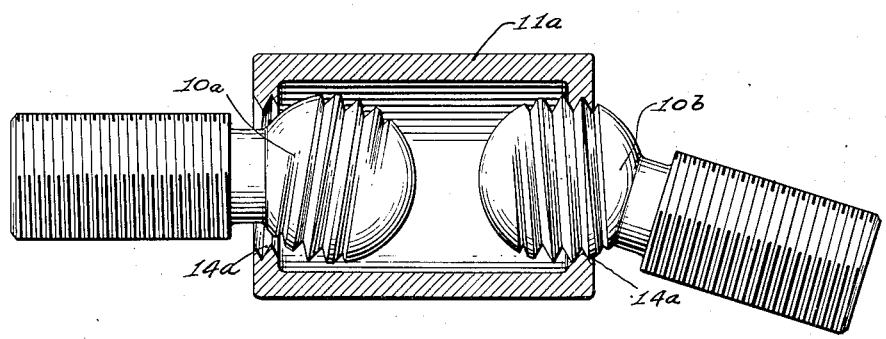
INVENTOR.
Richard T. Reese,
BY
Attorney.

Patented Nov. 28, 1950

2,531,892

UNITED STATES PATENT OFFICE 2,531,892

BOLT AND NUT FIXTURE

Richard T. Reese, North Hollywood, Calif.

Application January 27, 1947, Serial No. 724,635

3 Claims. (Cl. 287—21)

My invention relates to means for holding parts in place, particularly when subjected to intense vibration.

The difficulty of maintaining tightened parts secured by nuts and bolts in airplanes, for example, is well known, use being generally made of castellated nuts and cotter pins, since otherwise the nuts are very likely to slack back under the combined effects of tension and vibration.

An object of the invention is to provide a construction of threaded connection between a part and a member into which it is threaded, which will remain tight under conditions which would loosen such constructions hitherto in use.

It is a further object of the invention to provide a threaded connection which is simple and inexpensive to produce.

Another object of my invention is to produce a threaded connection which holds the connected parts more firmly together as any axially applied force tending to separate the connected parts is increased.

A further object of the invention is to provide a threaded connection which is made up with the parts initially angularly disposed, but enabling them to be axially aligned when the connection is made after which the connection cannot become loose by the action of forces acting axially on the connection.

Still further objects and features of the invention will hereinafter appear in the following specification taken in conjunction with the accompanying drawings, illustrating preferred forms of my invention.

In the drawings:

Fig. 1 is a side elevation partly in section showing a form of the invention including a single threaded ball and sleeve operatively connected; and Fig. 2 is a side elevation partly in section of a modified form of the invention showing threaded ball members attached to opposite ends of a common sleeve.

In Fig. 1 of the drawing, the threaded members 10 and 11 are arranged to provide a ball and socket connection which will securely retain the parts against axial displacement while permitting them to move relatively to one another.

The part 10 is furnished with a spheroidal head 12 on which is cut a thread 13 which is tapered rearwardly in diameter from the equatorial region because of the spherical contour of the head.

The member 11 is chambered and has an inwardly extending annular flange 14 which is threaded to mate with the threads on the ball 12. The ball 12 is screwed into member 11 until the threads thereon pass inwardly free of the threads in flange 14, after which an axial pull on the members cannot cause separation of the parts even under conditions of extreme vibration if the axes of the members are at an angle to one another since the threads on the members cannot be matched.

In the form of the invention shown in Fig. 2, two ball headed members 10a and 10b are shown engaged in a sleeve 11a provided at each end with an inwardly projecting flange 14a.

The ball ends of members 10a and 10b are screw threaded, the axis of the screw thread being oblique to the longitudinal axis of the members 10a, 10b.

A screw thread meshing with the thread on the ball ends is cut in the inwardly projecting flanges and the ball ends may be screwed into the sleeve by rotating the ends of the members in a circle about the ball end until the threads on the ball ends pass inwardly beyond the threaded rim. If an axial pull in opposite directions is applied to the sleeve and either member, the threads on the ball end will be positively prevented from engaging the thread in the rim so that there is no danger of the connection slacking back under the combined effects of tension and vibration.

While I have particularly described and illustrated various forms of the threaded connection of my invention, it is to be understood that changes or modifications of parts may be made by those skilled in the art without departing from the scope of the invention as intended to be defined by the appended claims.

I claim:

1. A threaded connection including: a first part provided with a spheroidal screw threaded part; a sleeve provided with a recess and an internally threaded annular flange at the end thereof adapted to mesh with the screw thread of said first part, the screw threads on the parts being arranged so that they are initially in mesh when the parts are screwed together during the initial movement of the spheroidal part into the sleeve, but pass out of mesh on further movement of the spheroidal part into the sleeve, though in abutment with each other to prevent displacement of the parts by an axially applied force.

2. A threaded connection as set forth in claim 1 and in which the thread on said spheroidal part is formed helically on a diametrical axis inclined from the common longitudinal axis of the first part and spheroidal head carried thereby.

3. A threaded connection as set forth in claim 1 and in which the thread on said spheroidal part is formed helically on a diametrical axis inclined from the common longitudinal axis of the first part and spheroidal head carried thereby, the construction assuring that when the parts are in fully engaged relation, an axially applied force will hold the threads on the parts against assuming a position in which relative rotation of the parts could cause meshing of the threads.

RICHARD T. REESE.

REFERENCES CITED

The following references are of record in the file of this patent:

UNITED STATES PATENTS

| Number | Name | Date |
|---|---|---|
| 277,408 | Carleton | May 8, 1883 |
| 1,061,871 | Ryan | May 13, 1913 |
| 1,523,463 | Thompson | Jan. 20, 1925 |
| 1,657,244 | Dardelet | Jan. 24, 1928 |
| 1,905,869 | Hope | Apr. 25, 1933 |
| 2,245,419 | Unke | June 10, 1941 |

FOREIGN PATENTS

| Number | Country | Date |
|---|---|---|
| 353,362 | France | June 27, 1905 |
| 564,454 | France | Dec. 21, 1923 |
| 226,987 | Switzerland | Aug. 2, 1943 |